(12) United States Patent
Johansen et al.

(10) Patent No.: US 11,985,987 B2
(45) Date of Patent: May 21, 2024

(54) CHEESE-LIKE PRODUCT, USE THEREOF AND METHOD FOR PREPARING SAME

(71) Applicant: Arla Foods Amba, Viby (DK)

(72) Inventors: Bo Hedegaard Johansen, Viby (DK);
Claus Bukbjerg Andersen, Viby (DK);
Karoline Borg Thomsen, Viby (DK)

(73) Assignee: ARLA FOODS AMBA, Viby J (DK)

( * ) Notice: Subject to any disclaimer, the term of this patent is extended or adjusted under 35 U.S.C. 154(b) by 0 days.

(21) Appl. No.: 17/795,171

(22) PCT Filed: Jan. 29, 2021

(86) PCT No.: PCT/EP2021/052051
§ 371 (c)(1),
(2) Date: Jul. 25, 2022

(87) PCT Pub. No.: WO2021/152057
PCT Pub. Date: Aug. 5, 2021

(65) Prior Publication Data
US 2023/0124870 A1    Apr. 20, 2023

(30) Foreign Application Priority Data

Jan. 29, 2020    (EP) .................................... 20154218

(51) Int. Cl.
| | |
|---|---|
| *A23C 19/05* | (2006.01) |
| *A23C 20/00* | (2006.01) |
| *A23C 21/02* | (2006.01) |
| *A23C 21/04* | (2006.01) |
| *A23C 21/06* | (2006.01) |

(52) U.S. Cl.
CPC .............. *A23C 20/00* (2013.01); *A23C 21/02* (2013.01); *A23C 21/04* (2013.01); *A23C 21/06* (2013.01)

(58) Field of Classification Search
CPC ......... A23C 20/00; A23C 21/02; A23C 21/04; A23C 21/06
USPC ........................................................ 426/582
See application file for complete search history.

(56) References Cited

U.S. PATENT DOCUMENTS

| | | |
|---|---|---|
| 2010/0303958 A1 | 12/2010 | Ur-Rehman et al. |
| 2013/0243926 A1 | 9/2013 | Atapattu et al. |
| 2015/0181903 A1† | 7/2015 | Uusi-Rauva |

(Continued)

FOREIGN PATENT DOCUMENTS

| | | |
|---|---|---|
| CN | 101301010 A | 11/2008 |
| CN | 103491790 A | 1/2014 |
| CN | 107205414 A | 9/2017 |

(Continued)

OTHER PUBLICATIONS

Bobe et al; "Separation and Quantification of Bovine Milk Proteins by Reversed-Phase High-Performance Liquid Chromatography;" J. Agric. Food Chem. 1998, 46, 458-463.

(Continued)

*Primary Examiner* — Brent T O'Hern
(74) *Attorney, Agent, or Firm* — Casimir Jones SC; Lisa Mueller

(57) ABSTRACT

The present invention relates to a method for preparing a cooking- and/or frying-stable cheese-like product, the cooking- and/or frying-stable cheese-like product and use of the cooking- and/or frying-stable cheese-like product.

12 Claims, 9 Drawing Sheets

(56) References Cited

U.S. PATENT DOCUMENTS

2018/0055064 A1* 3/2018 McLeod ............ A23C 19/0912
2018/0303125 A1 10/2018 Nurmi et al.

FOREIGN PATENT DOCUMENTS

| CN | 115581263 A | 1/2023 |
|---|---|---|
| EP | 2871966 B1 | 2/2017 |
| FR | 2556565 A1 | 6/1985 |
| GB | 2369283 A | 5/2002 |
| WO | 2009115546 A1 | 9/2009 |
| WO | 2013138728 A1 | 9/2013 |
| WO | 2017077189 A1 | 5/2017 |
| WO | 2021148422 † | 7/2021 |

OTHER PUBLICATIONS

Hammam, "Production and Storage Stability of High Concentrated Micellar Casin and its Effect on the Functional Properties of Process Cheese Products," Electronic Thesis and Dissertations, South Dakota State University, Jun. 1, 2019, 3411.

Yan Qing-quan et al., Effect of rate of casein and whey on quality of fresh cheese, Food Science and Technology, 40, 09, pp. 24-25, Sep. 2015, Translated Abstract only.

\* cited by examiner
† cited by third party

CHEESE-LIKE PRODUCT, USE THEREOF AND METHOD FOR PREPARING SAME

CROSS REFERENCE TO RELATED APPLICATIONS

This application is a national stage application under 35 U.S.C. § 371 of PCT International Application No. PCT/EP2021/052051, filed Jan. 29, 2021, which claims priority to European Application No. 20154218.0, filed Jan. 29, 2020, each of which are herein incorporated by reference in their entirety.

FIELD OF THE INVENTION

The present invention relates to a method for preparing a cooking- and/or frying-stable cheese-like product, the cooking- and/or frying-stable cheese-like product and use of the cooking- and/or frying-stable cheese-like product.

BACKGROUND

In recent years, a growing trend toward eating less meat and vegetarianism has arisen especially among young people, who due to their increasing awareness of health, the environment and/or compassion for animals want to eat less meat.

Halloumi-style cheese is very popular, as it can be grilled or fried without melting and therefore constitute a good alternative to meat, e.g. by using grilled halloumi in hamburgers instead of meat.

Halloumi is a semi-hard, unripened, brined cheese. Traditionally, halloumi is prepared by a conventional cheese making process, wherein raw milk is pasteurized, coagulated with a rennet to form a cheese curd (coagulum), and the curd is cut into blocks, whey is released and drained, the blocks are folded and heated in hot whey (94-96 degrees C.) for about 1 hour. The hot whey is then drained from the folded cheese blocks which are then cooled and salted or brined. Halloumi cheese can be fried and grilled.

French patent application FR2556565 describes production of Halloumi cheese from milk that is ultrafiltered to obtain a higher protein and dry matter content in the milk. The milk is then processed in conventional matter (as described above) to Halloumi cheese.

The production of halloumi-like cheeses is typically demanding as they include many production steps and the production method implies restrictions on the products produced.

SUMMARY OF THE INVENTION

The invention pertains to a method for preparing a cooking- and/or frying-stable cheese-like product, which method comprises the steps of:
a) providing a liquid composition having a dry matter content of at least 34% w/w, a protein content of at least 12% w/w, a content of micellar casein of at least 8% w/w, and wherein the liquid composition has a pH in the range of 4.8-7.0 and a ratio of whey protein to micellar casein of 12:88 to 0:100,
b) subjecting the liquid composition to a coagulation step by adding a milk-clotting enzyme, and allowing the liquid composition to coagulate to obtain a coagulated composition,
c) optionally, cutting the coagulated composition,
d) subjecting the coagulated composition from step b) or c) to heating to obtain a core temperature of the coagulated composition of at least 70 degrees C., and
e) cooling the heat-treated coagulated composition,
wherein the cooking- and/or frying-stable cheese-like product is the coagulated composition obtained under step d) or e).

The invention further pertains to a cooking- and/or frying-stable cheese-like product obtainable by the inventive method.

In addition, the invention pertains to a cooking- and/or frying-stable cheese-like product having a dry matter content of at least 34% w/w, a protein content of at least 12% w/w, a content of casein of at least 8% w/w, a pH in the range of 4.8-7.0 and a ratio of whey protein to casein of 12:88 to 0:100.

Additionally, the invention pertains to the use of the cooking- and/or frying-stable cheese-like product in a food product.

DETAILED DESCRIPTION

Figure 1:
FIG. 1 shows the coagulated composition cut into blocks.

The invention concerns a method for making a cooking- and/or frying-stable cheese-like product. The inventors have found that by increasing (relative to natural milk) the content of micellar casein and dry matter of the liquid composition, and further control the ratio between whey and micellar casein, it is possible to obtain a cooking- and/or frying-stable cheese-like product having a high texture and mouthfeel and a creamy, milk and aromatic taste, i.e. same properties as provided by Halloumi cheese. In one embodiment of the invention, the cooking- and/or frying-stable cheese-like product prepared by the inventive method is softer than Halloumi prepared by the conventional halloumi process.

The invention concerns a method for preparing a cooking- and/or frying-stable cheese-like product, which method comprises the steps of:
a) providing a liquid composition having a dry matter content of at least 34% w/w, a protein content of at least 12% w/w, a content of micellar casein of at least 8% w/w, and wherein the liquid composition has a pH in the range of 4.8-7.0 and a ratio of whey protein to micellar casein of 12:88 to 0:100, b) subjecting the liquid composition to a coagulation step by adding a milk-clotting enzyme, and allowing the liquid composition to coagulate to obtain a coagulated composition, c) optionally, cutting the coagulated composition, d) subjecting the coagulated composition from step b) or c) to heating to obtain a core temperature of the coagulated composition of at least 70 degrees C., and e) cooling the heat-treated coagulated composition, wherein the cooking- and/or frying-stable cheese-like product is the coagulated composition obtained under step d) or e).

The method according to the invention is a simple and flexible setup, simpler than conventional methods for producing halloumi-like cheeses, as the coagulated composition (the cheese curd) need not to be cut into blocks or grains and subsequently folded or pressed. A further advantage is that during the production of the cooking- and/or frying-stable cheese-like product substantially no whey is released and needs to be separated from the coagulated composition, even if the coagulated composition is cut into blocks or grains, substantially no whey is released from the coagulum. This has the advantage that the liquid composition can be coagulated (step b), optionally cut (step c) and subsequently heated (step d) substantially without release of and drainage of whey. The inventive method also impacts the cooking- and/or frying-stable cheese-like product produced by the method, as the method allows filling the liquid composition provided in step a) directly into a sales package, coagulating the liquid composition in the sales package so that a coagulated composition forms in the sales package. The coagulated composition can then be heat treated directly in the sales package. A further advantage is that, because no whey is released, the method gives a 100% yield.

In the context of the present invention, the term "cheese-like product" relates to a cheese product, a cheese substitute or a cheese analogue. A cheese substitute is a cheese product, where the protein is partly replaced by starch, and milk fat can, optionally, be substituted fully or partly by vegetable fat. A cheese analogue is a cheese product, where milk fat is replaced fully or partly by vegetable fat.

In the context of the present invention, the term "frying-stable" means that the fried product during and after frying substantially maintains its original shape, does not melt and shows no change in viscosity.

In the context of the present invention, the term "cooking- and/or frying-stable" means that the cooked product during and after cooking substantially maintains its original shape, does not melt and shows no change in viscosity.

The dry matter content of the liquid composition is increased compared to conventional cheese milk, which typically has a dry matter content in the range of 10-15% w/w. The liquid composition provided in step a) may have a dry matter content in the range of 34-52% w/w. In one embodiment of the invention, the liquid composition has a dry matter content in the range of 38-50% w/w, such as in the range of 40-50% w/w or in the range of 42-50% w/w.

Milk typically has a protein content of 3-4% w/w. The protein content of the liquid composition provided in step a) may be in the range of 12-30% w/w. In one embodiment of the invention, the protein content is in the range of 12-25% w/w, in the range of 15-22% w/w or in the range of 17-20% w/w.

The amount of micellar casein is of importance and the liquid composition provided under step a) should have a content of micellar casein of at least 8% w/w. The content of micellar casein may be in the range of 8-30% w/w, such as in the range of 10-30% w/w, in the range of 13-22% w/w or in the range of 15-20% w/w. The content of micellar casein contributes to the total amount of protein in the liquid composition.

In the context of the present invention the term "micellar casein" and "casein micelles" pertains to casein in form of micelle-like structures comprising the different casein species as well as minerals such as calcium and phosphate. The term "native micellar casein" pertains to the casein micelles found in and isolated from natural milk, e.g. by ultracentrifugation or microfiltration, typically using microfiltration membrane having a pore size that retains casein micelles but allows for the passage of whey proteins. Microfiltration membranes having a pore size of 0.05-0.3 micron are preferred. The amount of micellar casein is typically determined by separation of the casein micelles by ultracentrifugation, preferably by initial equilibration at 30 degrees C. for 1 hour and centrifugation at 100,000 g for 1 hour at the same temperature, and subsequent quantification of the amount separated caseins by HPLC, preferably as outlined in Bobe et al, (Separation and Quantification of Bovine Milk Proteins by Reversed-Phase High-Performance Liquid Chromatography; Bobe et al; J. Agric. Food Chem. 1998, 46, 458-463).

The inventors have found that by controlling the ratio between whey protein and micellar casein in the liquid composition used for preparing cheese-like product, it is possible to obtain a cooking- and/or frying-stable cheese-like product having the desired properties.

The amount of micellar casein in the liquid composition provided under step a) can have a ratio of whey protein to micellar casein of 12:88 to 0:100, such as a ratio of whey protein to micellar casein 11:89 to 0:100, 10:90 to 0:100, 9:91 to 0:100, 8:92 to 0:100, 7:93 to 0:100, 6:94 to 0:100, 5:95 to 0:100, 4:96 to 0:100, 3:97 to 0:100, 2:98 to 0:100, or a ratio of whey protein to micellar casein of 1:99 to 0:100. In one embodiment of the invention, the ratio of whey protein to micellar casein is 12:88 to 0:100, 12:88 to 1:99, 12:88 to 2:98, 12:88 to 3:97, 12:88 to 4:96, or a ratio of whey protein to micellar casein is 12:88 to 5:95.

In one embodiment of the invention, the invention pertains to a method for preparing a cooking- and/or frying-stable cheese-like product, which method comprises the steps of:

a) providing a liquid composition having a dry matter content in the range of 34-52% w/w, a protein content in the range of 12-30% w/w, a content of micellar casein in the range of 8-25% w/w, and wherein the liquid composition has a pH in the range of 4.8-7.0 and a ratio of whey protein to micellar casein of 12:88 to 0:100, b) subjecting the liquid composition to a coagulation step by adding a milk-clotting enzyme, and allowing the liquid composition to coagulate to obtain a coagulated composition, c) optionally, cutting the coagulated composition, d) subjecting the coagulated composition from step b) or c) to heating to obtain a core temperature of the coagulated composition of at least 70 degrees C., and e) cooling the heat-treated coagulated composition, wherein the cooking- and/or frying-stable cheese-like product is the coagulated composition obtained under step d) or e).

In a preferred embodiment of the invention, the invention pertains to a method for preparing a cooking- and/or frying-stable cheese-like product, which method comprises the steps of:
- a) providing a liquid composition having a dry matter content in the range of 34-50% w/w, a protein content in the range of 12-25% w/w, a content of micellar casein in the range of 10-25% w/w, and wherein the liquid composition has a pH in the range of 4.8-7.0 and a ratio of whey protein to micellar casein of 10:90 to 0:100,
- b) subjecting the liquid composition to a coagulation step by adding a milk-clotting enzyme, and allowing the liquid composition to coagulate to obtain a coagulated composition,
- c) optionally, cutting the coagulated composition,
- d) subjecting the coagulated composition from step b) or c) to heating to obtain a core temperature of the coagulated composition of at least 70 degrees C., and
- e) cooling the heat-treated coagulated composition, wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
- a) providing a liquid composition having a dry matter content in the range of 40-50% w/w, a protein content in the range of 15-22% w/w, a content of micellar casein in the range of 13-22% w/w, and wherein the liquid composition has a pH in the range of 4.8-7.0 and a ratio of whey protein to micellar casein of 8:92 to 0:100,
- b) subjecting the liquid composition to a coagulation step by adding a milk-clotting enzyme, and allowing the liquid composition to coagulate to obtain a coagulated composition,
- c) optionally, cutting the coagulated composition,
- d) subjecting the coagulated composition from step b) or c) to heating to obtain a core temperature of the coagulated composition of at least 70 degrees C., and
- e) cooling the heat-treated coagulated composition, wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
- a) providing a liquid composition having a dry matter content in the range of 42-50% w/w, a protein content in the range of 17-20% w/w, a content of micellar casein in the range of 15-20% w/w, and wherein the liquid composition has a pH in the range of 4.8-7.0 and a ratio of whey protein to micellar casein of 6:94 to 0:100,
- b) subjecting the liquid composition to a coagulation step by adding a milk-clotting enzyme, and allowing the liquid composition to coagulate to obtain a coagulated composition,
- c) optionally, cutting the coagulated composition,
- d) subjecting the coagulated composition from step b) or c) to heating to obtain a core temperature of the coagulated composition of at least 70 degrees C., and
- e) cooling the heat-treated coagulated composition, wherein the cooking- and/or frying-stable cheese-like product is the coagulated composition obtained under step d) or e).

In order to provide the liquid composition of step a) it may be advantageous to provide the liquid composition from a micellar casein source having increased content of micellar casein compared to natural milk. By the term "natural milk" is understood milk, which composition has not been amended after milking. In a preferred embodiment the liquid composition is prepared from an isolate of micellar casein, e.g. by mixing an isolate of micellar casein with water. In an even more preferred embodiment the liquid composition is prepared from an isolate of micellar casein and milk powder, e.g. skimmed milk powder.

In the context of the present invention, the term "micellar casein isolate" pertains to casein in form of micelle-like structures comprising the different casein species as well as minerals such as calcium and phosphate, which is isolated from milk, e.g. by ultracentrifugation or microfiltration, typically using microfiltration membrane having a pore size that retains casein micelles but allows for the passage of whey protein.

One advantage is that the inventive method allows addition of protein of both animal and/or vegetable origin in addition to the micellar casein comprised in the liquid composition. Micellar casein can be derived from milk, meaning that the liquid composition will comprise animal protein in the form micellar casein. However, the liquid composition may comprise animal protein in addition to the micellar casein, e.g. other milk proteins than micellar casein. Milk protein can be obtained from milk suitable for human consumption, such as milk from cow, sheep, goat, camel, mare or any other animal that produces milk suitable for human consumption. Preferably the milk protein is obtained from cow milk.

The liquid composition of step a) can be provided by pre-processing milk as desired to obtain the amount of dry matter, micellar casein, protein, fat and/or lactose or can be provided by mixing ingredients, i.e. dry ingredients with a liquid and thereby obtain the liquid composition of step a). The liquid composition can be prepared by mixing one or more ingredients selected from the group of water, whey, milk, reconstituted milk, full-fat (whole) milk, cream, low-fat milk, skim milk, buttermilk, colostrum, low-lactose milk, lactose-free milk, whey protein depleted milk, ultrafiltered milk, microfiltered milk, reconstituted (recombined) milk powder, whey powder, whey protein concentrate (WPC), whey protein isolate (WPI), serum protein concentrate (SPC). The ingredient can be obtained from milk suitable for human consumption, such as milk from cow, sheep, goat, camel, mare or a combination thereof. Preferably, the ingredient is prepared from milk from cow, sheep or goat or a combination of milk from cow, sheep and goat.

In one embodiment, the liquid composition comprises a vegetable protein in combination with the micellar casein and/or further milk protein comprised in the liquid composition of step a). Any vegetable protein, which can be consumed by human, can be used to provide the liquid composition. Vegetable proteins suitable for preparing the cheese-like product of the invention are proteins derived from the group selected from beans, legumes, green leaves, vegetables, soy proteins, legume proteins, lentils, mushrooms, bacteria, fungus and a combination thereof. In a preferred embodiment, the vegetable protein is selected from soy protein, pea protein and lentil protein.

In some embodiments, the liquid composition provided under step a) has a fat content in the range of 5-30% w/w, such as in the range of 10-30% w/w, in the range of 15-25% w/w or in the range of 17-22% w/w.

In one embodiment, the liquid composition provided under step a) comprises a fat selected from animal fat and/or vegetable fat. The liquid composition may comprise one or more animal fats, preferred is milk fat. The milk fat may be derived from cream, acidified cream, cream powder, whole milk powder, anhydrous milk fat and/or butter.

The liquid composition may further comprise one or more vegetable fats. The vegetable fat may be selected from the group consisting of palm fat, palm kernel fat, oat oil, coconut fat, maize oil, sesame oil, soya oil, soya bean oil, linseed oil, grape seed oil, rapeseed oil, olive oil, groundnut oil, sunflower oil, safflower oil and a combination thereof. In one embodiment of the invention, the liquid composition comprises only vegetable fat.

In one embodiment of the invention, the liquid composition may comprise a combination of one or more animal fats and one or more vegetable fat. In a preferred embodiment, the liquid composition comprises a combination of milk fat and vegetable fat selected from the group of palm fat, palm kernel fat and coconut fat.

In one embodiment of the invention, the invention pertains to a method for preparing a cooking- and/or frying-stable cheese-like product, which method comprises the steps of:
a) providing a liquid composition having a dry matter content in the range of 34-52% w/w, a protein content in the range of 12-30% w/w, a content of micellar casein in the range of 8-25% w/w, a fat content in the range of 5-30% w/w, and wherein the liquid composition has a pH in the range of 4.8-7.0 and a ratio of whey protein to micellar casein of 12:88 to 0:100,
b) subjecting the liquid composition to a coagulation step by adding a milk-clotting enzyme, and allowing the liquid composition to coagulate to obtain a coagulated composition,
c) optionally, cutting the coagulated composition,
d) subjecting the coagulated composition from step b) or c) to heating to obtain a core temperature of the coagulated composition of at least 70 degrees C., and
e) cooling the heat-treated coagulated composition,
wherein the cooking- and/or frying-stable cheese-like product is the coagulated composition obtained under step d) or e).

In a preferred embodiment of the invention, the invention pertains to a method for preparing a cooking- and/or frying-stable cheese-like product, which method comprises the steps of:
a) providing a liquid composition having a dry matter content in the range of 34-50% w/w, a protein content in the range of 12-25% w/w, a content of micellar casein in the range of 10-25% w/w, a fat content in the range of 5-30% w/w, and wherein the liquid composition has a pH in the range of 4.8-7.0 and a ratio of whey protein to micellar casein of 10:90 to 0:100,
b) subjecting the liquid composition to a coagulation step by adding a milk-clotting enzyme, and allowing the liquid composition to coagulate to obtain a coagulated composition,
c) optionally, cutting the coagulated composition,
d) subjecting the coagulated composition from step b) or c) to heating to obtain a core temperature of the coagulated composition of at least 70 degrees C., and
e) cooling the heat-treated coagulated composition,
wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
a) providing a liquid composition having a dry matter content in the range of 40-50% w/w, a protein content in the range of 15-22% w/w, a content of micellar casein in the range of 13-22% w/w, a fat content in the range of 5-30% w/w, and wherein the liquid composition has a pH in the range of 4.8-7.0 and a ratio of whey protein to micellar casein of 8:92 to 0:100,
b) subjecting the liquid composition to a coagulation step by adding a milk-clotting enzyme, and allowing the liquid composition to coagulate to obtain a coagulated composition,
c) optionally, cutting the coagulated composition,
d) subjecting the coagulated composition from step b) or c) to heating to obtain a core temperature of the coagulated composition of at least 70 degrees C., and
e) cooling the heat-treated coagulated composition,
wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
a) providing a liquid composition having a dry matter content in the range of 42-50% w/w, a protein content in the range of 17-20% w/w, a content of micellar casein in the range of 15-20% w/w, a fat content in the range of 5-30% w/w, and wherein the liquid composition has a pH in the range of 4.8-7.0 and a ratio of whey protein to micellar casein of 6:94 to 0:100,
b) subjecting the liquid composition to a coagulation step by adding a milk-clotting enzyme, and allowing the liquid composition to coagulate to obtain a coagulated composition,
c) optionally, cutting the coagulated composition,
d) subjecting the coagulated composition from step b) or c) to heating to obtain a core temperature of the coagulated composition of at least 70 degrees C., and
e) cooling the heat-treated coagulated composition,
wherein the cooking- and/or frying-stable cheese-like product is the coagulated composition obtained under step d) or e).

The cooking- and/or frying-stable cheese-like product may be seasoned, e.g. by adding a seasoning ingredient directly to the liquid composition provided under step a). Such cooking- and/or frying-stable cheese-like product can be obtained by providing a liquid composition under step a), wherein the liquid composition comprises one or more of salt, sugar, herbs, spices or combinations thereof. Alternatively, the coagulated composition can be seasoned with one or more of the mentioned seasoning ingredients.

The liquid composition of step a) may be homogenized. In one embodiment, the liquid composition is mixed to form a homogeneous liquid composition, e.g. by using a high shear mixer. Alternatively, the liquid composition may be homogenized by using a batch cooker.

The liquid composition provided under step a) may be heated in order to reduce the number of microbes in the liquid composition. In one embodiment, the liquid composition is heated to a temperature sufficient to obtain at least partial microbial reduction. In one embodiment of the invention, the mixture is heated to a temperature of at least 70 degrees C. for a duration of time sufficient to obtain at least partial microbial reduction. Preferably, the liquid composition is heated to a temperature of at least 72 degrees C. for at least 15 seconds.

After heating, the liquid composition may be cooled to a temperature in the range of 20-50 degrees C.

The pH of the liquid composition of step a) should be in the range of 4.8-7.0. The pH of the liquid composition can be provided by adding an acidifier when providing the liquid composition of step a) or by use of a starter culture. When using a starter culture to provide a liquid composition having a pH in the range of 4.8-7.0, various starter cultures and mixtures of starter cultures may be used. The most common starter cultures include a mesophilic culture (lactococcal starter) and culture responsible for developing taste (mesophilic and/or thermophilic adjunct starter). The choice of starter culture depends on the desired characteristics of the cooking- and/or frying-stable cheese-like product.

In a preferred embodiment of the invention, the food grade acids are used for adjusting the pH of the liquid composition. Food grade acids can be contained in juices from various fruits such as citrus juices, or chemically produced acids. Examples of suitable acidifiers are Glucono Delta-Lactone (GDL), citric acid, phosphoric acid, lactic acid, lemon juice, lime juice and mixtures thereof.

In one embodiment of the invention, the pH of the liquid composition is in the range of 4.8-6.5, such as in the range of 4.8-6.0 or in the range of 4.8-5.7. In another embodiment, the pH of the liquid composition is in the range of 5.0-7.0, such as in the range of 5.5-7.0 or in the range of 6.0-7.0.

The amount of starter culture to be added to the starter and its amount depends on the cheese type and the conditions used. It is known that the amount of bulk starter is usually 0.5 to 2% w/w, typically 0.7 to 0.8% w/w. The amount of DVS starter (DVS/DVI) is usually 0.001 to 0.2% w/w, typically 0.01 to 0.05% w/w.

In one embodiment of the invention, the invention pertains to a method for preparing a cooking- and/or frying-stable cheese-like product, which method comprises the steps of:
  a) providing a liquid composition having a dry matter content in the range of 34-52% w/w, a protein content in the range of 12-30% w/w, a content of micellar casein in the range of 8-25% w/w, a fat content in the range of 5-30% w/w, and wherein the liquid composition has a pH in the range of 4.8-7.0 and a ratio of whey protein to micellar casein of 8:92 to 0:100,
  b) subjecting the liquid composition to a coagulation step by adding a milk-clotting enzyme, and allowing the liquid composition to coagulate to obtain a coagulated composition,
  c) optionally, cutting the coagulated composition,
  d) subjecting the coagulated composition from step b) or c) to heating to obtain a core temperature of the coagulated composition of at least 70 degrees C., and
  e) cooling the heat-treated coagulated composition,
wherein the cooking- and/or frying-stable cheese-like product is the coagulated composition obtained under step d) or e).

In a preferred embodiment of the invention, the invention pertains to a method for preparing a cooking- and/or frying-stable cheese-like product, which method comprises the steps of:
  a) providing a liquid composition having a dry matter content in the range of 34-50% w/w, a protein content in the range of 12-25% w/w, a content of micellar casein in the range of 10-25% w/w, a fat content in the range of 5-30% w/w, and wherein the liquid composition has a pH in the range of 4.8-6.5 and a ratio of whey protein to micellar casein of 10:90 to 0:100,
  b) subjecting the liquid composition to a coagulation step by adding a milk-clotting enzyme, and allowing the liquid composition to coagulate to obtain a coagulated composition,
  c) optionally, cutting the coagulated composition,
  d) subjecting the coagulated composition from step b) or c) to heating to obtain a core temperature of the coagulated composition of at least 70 degrees C., and
  e) cooling the heat-treated coagulated composition,
wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
  a) providing a liquid composition having a dry matter content in the range of 40-50% w/w, a protein content in the range of 15-22% w/w, a content of micellar casein in the range of 13-22% w/w, a fat content in the range of 5-30% w/w, and wherein the liquid composition has a pH in the range of 4.8-6.0 and a ratio of whey protein to micellar casein of 8:96 to 0:100,
  b) subjecting the liquid composition to a coagulation step by adding a milk-clotting enzyme, and allowing the liquid composition to coagulate to obtain a coagulated composition,
  c) optionally, cutting the coagulated composition,
  d) subjecting the coagulated composition from step b) or c) to heating to obtain a core temperature of the coagulated composition of at least 70 degrees C., and
  e) cooling the heat-treated coagulated composition,
wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
  a) providing a liquid composition having a dry matter content in the range of 42-50% w/w, a protein content in the range of 17-20% w/w, a content of micellar casein in the range of 15-20% w/w, a fat content in the range of 5-30% w/w, and wherein the liquid composition has a pH in the range of 4.8-5.7 and a ratio of whey protein to micellar casein of 6:94 to 0:100,
  b) subjecting the liquid composition to a coagulation step by adding a milk-clotting enzyme, and allowing the liquid composition to coagulate to obtain a coagulated composition,
  c) optionally, cutting the coagulated composition,
  d) subjecting the coagulated composition from step b) or c) to heating to obtain a core temperature of the coagulated composition of at least 70 degrees C., and
  e) cooling the heat-treated coagulated composition,
wherein the cooking- and/or frying-stable cheese-like product is the coagulated composition obtained under step d) or e).

In step b) of the inventive method, the liquid composition provided in step a) is subjected to a coagulation step by adding a milk-clotting enzyme to the liquid composition and allowing the liquid composition to coagulate to obtain a coagulated composition.

The temperature of the liquid composition under step b) may be in the range of 20-50 degrees C. Preferably, the temperature of the liquid composition is in the range of 35-45 degree C. or in the range of 38-42 degree C.

The milk clotting enzyme can be derived from animal or selected from the group consisting of rennet, chymosin, pepsin, or enzymes produced by microbes *Rhizomucor miehei* (Hannilase) and *Cryphonectria* (Endothia) *parasitica* (Suparen). In some embodiments of the invention the milk clotting enzyme may be used together with a transglutaminase.

The milk-clotting enzyme is added to the liquid composition and the composition is allowed to coagulate for at least 15 minutes. In one embodiment of the invention, the liquid composition is allowed to coagulate for about 15-120 minutes, such as about 15-90 minutes or for about 20-40 minutes.

The coagulation under step b) may be carried out in a container, a vessel, a tub, a cheese vat or directly in a sales package, a consumer package, a retail package or a carton.

In the context of the present invention, the term "sales package" means a package that contains the cooking- and/or frying-stable cheese-like product of the invention and is ready for sale to retail, consumers, household, industrial kitchens (hospitals, canteens, restaurants) or to catering. The term "sales package" includes, but are not limited to, packages ready for sale to consumers (consumer package), packages ready for sale to retail (retail packages) bulk packages for catering or industrial kitchens.

The volume of the sales package may vary. In one embodiment of the invention, the sales package has a volume corresponding to the volume of cooking- and/or frying-stable cheese-like product needed for a meal for one person, e.g. a volume of less than 100 ml. The sales package may be shaped in any form, e.g. shaped like a hamburger or a filet. The sales package may contain a coated cooking- and/or frying-stable cheese-like product, e.g. where the cooking- and/or frying-stable cheese-like product is coated before being packaged. In an alternative embodiment, the sales package has a volume corresponding to the volume of a meal for two or more persons, e.g. a volume of more than 100 ml. The cooking- and/or frying-stable cheese-like product can be taken out of the package and sliced or cut into pieces before being consumed, e.g. before being fried or grilled.

When using the sales package for coagulation and/or heating, the sales package should be made of a material, which can withstand cooking temperatures, e.g. temperatures up to 100-110 degrees C. The sales package may be made from metal, plastic, cardboard, glass or a combination thereof.

In one embodiment, the sales package is made from metal such as aluminum, or aluminum alloys or steel. In one embodiment, the sales package is a can with a lid, such as a round can, a shaped can or a bowl can. The inner side of the can may be coated with a food grade coating so that the cooking- and/or frying-stable cheese-like product is not directly in contact with the metal.

In one embodiment, the sales package is made from plastic such as polypropylene (PP), which can withstand temperatures up to 120 degrees C. The sales package may be made from hard plastic, semi-hard plastic or soft plastic. In one embodiment, the sales package is made from a combination of hard or semi-hard plastic and a soft plastic foil or plastic film. The hard or semi-hard package may be formed in any desirable shape and may be filled with the liquid composition according to the invention and optionally sealed with a plastic foil or plastic film. The liquid composition may then coagulate and subsequently heated in the package and is thereby shaped in the specific shape of the sales package. In one embodiment of the invention, the sales package is a bag made from semi-hard plastic, plastic foil or plastic film, e.g. a plastic bag, which form a tube or sausage shape by being closed at each end of the bag.

In one embodiment of the invention, the invention pertains to a method for preparing a cooking- and/or frying-stable cheese-like product, which method comprises the steps of:
 a) providing a liquid composition having a dry matter content in the range of 34-52% w/w, a protein content in the range of 12-30% w/w, a content of micellar casein in the range of 8-25% w/w, a fat content in the range of 5-30% w/w, and wherein the liquid composition has a pH in the range of 4.8-7.0 and a ratio of whey protein to micellar casein of 12:88 to 0:100,
 b) filling the liquid composition and a milk clotting enzyme in a sales package and optionally hermetically closing the sales package, thereafter subjecting the liquid composition to a coagulation step by allowing the liquid composition and milk clotting enzyme to coagulate to obtain a coagulated composition,
 c) optionally, cutting the coagulated composition,
 d) subjecting the coagulated composition from step c) to heating to obtain a core temperature of the coagulated composition of at least 70 degrees C., and
 e) cooling the heat-treated coagulated composition,
wherein the cooking- and/or frying-stable cheese-like product is the coagulated composition obtained under step d) or e).

In a preferred embodiment of the invention, the invention pertains to a method for preparing a cooking- and/or frying-stable cheese-like product, which method comprises the steps of:
 a) providing a liquid composition having a dry matter content in the range of 34-50% w/w, a protein content in the range of 12-25% w/w, a content of micellar casein in the range of 10-25% w/w, a fat content in the range of 5-30% w/w, and wherein the liquid composition has a pH in the range of 4.8-6.5 and a ratio of whey protein to micellar casein of 10:90 to 0:100,
 b) filling the liquid composition and a milk clotting enzyme in a sales package and optionally hermetically closing the sales package, thereafter subjecting the liquid composition to a coagulation step by allowing the liquid composition and milk clotting enzyme to coagulate to obtain a coagulated composition,
 c) optionally, cutting the coagulated composition,
 d) subjecting the coagulated composition from step c) to heating to obtain a core temperature of the coagulated composition of at least 70 degrees C., and
 e) cooling the heat-treated coagulated composition,
wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
 a) providing a liquid composition having a dry matter content in the range of 40-50% w/w, a protein content in the range of 15-22% w/w, a content of micellar casein in the range of 13-22% w/w, a fat content in the range of 5-30% w/w, and wherein the liquid composition has a pH in the range of 4.8-6.0 and a ratio of whey protein to micellar casein of 8:92 to 0:100,
  b) filling the liquid composition and a milk clotting enzyme in a sales package and optionally hermetically closing the sales package, thereafter subjecting the liquid composition to a coagulation step by allowing the liquid composition and milk clotting enzyme to coagulate to obtain a coagulated composition,
  c) optionally, cutting the coagulated composition,
  d) subjecting the coagulated composition from step c) to heating to obtain a core temperature of the coagulated composition of at least 70 degrees C., and
  e) cooling the heat-treated coagulated composition, wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
  a) providing a liquid composition having a dry matter content in the range of 42-50% w/w, a protein content in the range of 17-20% w/w, a content of micellar casein in the range of 15-20% w/w, a fat content in the range of 5-30% w/w, and wherein the liquid composition has a pH in the range of 4.8-5.7 and a ratio of whey protein to micellar casein of 6:94 to 0:100,
  b) filling the liquid composition and a milk clotting enzyme in a sales package and optionally hermetically closing the sales package, thereafter subjecting the liquid composition to a coagulation step by allowing the liquid composition and milk clotting enzyme to coagulate to obtain a coagulated composition,
  c) optionally, cutting the coagulated composition,
  d) subjecting the coagulated composition from step c) to heating to obtain a core temperature of the coagulated composition of at least 70 degrees C., and
  e) cooling the heat-treated coagulated composition, wherein the cooking- and/or frying-stable cheese-like product is the coagulated composition obtained under step d) or e).

In step c) of the inventive method, the coagulated composition is optionally subjected to cutting. If the coagulated composition is subjected to cutting, preferably, no whey or substantially no whey is released from the coagulated composition during cutting and after the cutting. The coagulated composition can be cut into blocks, cubes (e.g. cheese grains) or slices. In one embodiment of the invention, the coagulated composition is cut and at most 5% w/w whey is released from the coagulated composition during cutting and after the cutting. Preferably, the amount of whey released during and after cutting is at most 4% w/w, at most 3% w/w, at most 2% w/w or at most 1% w/w.

In one embodiment of the invention, the invention pertains to a method for preparing a cooking- and/or frying-stable cheese-like product, which method comprises the steps of:
  a) providing a liquid composition having a dry matter content in the range of 34-52% w/w, a protein content in the range of 12-30% w/w, a content of micellar casein in the range of 8-25% w/w, a fat content in the range of 5-30% w/w, and wherein the liquid composition has a pH in the range of 4.8-7.0 and a ratio of whey protein to micellar casein of 12:88 to 0:100,
  b) subjecting the liquid composition to a coagulation step by adding a milk-clotting enzyme, and allowing the liquid composition to coagulate to obtain a coagulated composition,
  c) cutting the coagulated composition, wherein at most 5% w/w whey is released,
  d) subjecting the coagulated composition from step b) or c) to heating to obtain a core temperature of the coagulated composition of at least 70 degrees C., and
  e) cooling the heat-treated coagulated composition, wherein the cooking- and/or frying-stable cheese-like product is the coagulated composition obtained under step d) or e).

In a preferred embodiment of the invention, the invention pertains to a method for preparing a cooking- and/or frying-stable cheese-like product, which method comprises the steps of:
  a) providing a liquid composition having a dry matter content in the range of 34-50% w/w, a protein content in the range of 12-25% w/w, a content of micellar casein in the range of 10-25% w/w, a fat content in the range of 5-30% w/w, and wherein the liquid composition has a pH in the range of 4.8-6.5 and a ratio of whey protein to micellar casein of 10:90 to 0:100,
  b) subjecting the liquid composition to a coagulation step by adding a milk-clotting enzyme, and allowing the liquid composition to coagulate to obtain a coagulated composition,
  c) cutting the coagulated composition, wherein at most 4% w/w whey is released,
  d) subjecting the coagulated composition from step b) or c) to heating to obtain a core temperature of the coagulated composition of at least 70 degrees C., and
  e) cooling the heat-treated coagulated composition, wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
  a) providing a liquid composition having a dry matter content in the range of 40-50% w/w, a protein content in the range of 15-22% w/w, a content of micellar casein in the range of 13-22% w/w, a fat content in the range of 5-30% w/w, and wherein the liquid composition has a pH in the range of 4.8-6.0 and a ratio of whey protein to micellar casein of 8:92 to 0:100,
  b) subjecting the liquid composition to a coagulation step by adding a milk-clotting enzyme, and allowing the liquid composition to coagulate to obtain a coagulated composition,
  c) cutting the coagulated composition, wherein at most 3% w/w whey is released,
  d) subjecting the coagulated composition from step b) or c) to heating to obtain a core temperature of the coagulated composition of at least 70 degrees C., and
  e) cooling the heat-treated coagulated composition, wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
  a) providing a liquid composition having a dry matter content in the range of 42-50% w/w, a protein content in the range of 17-20% w/w, a content of micellar casein in the range of 15-20% w/w, a fat content in the range of 5-30% w/w, and wherein the liquid composition has a pH in the range of 4.8-5.7 and a ratio of whey protein to micellar casein of 6:94 to 0:100, b) subjecting the liquid composition to a coagulation step by adding a milk-clotting enzyme, and allowing the liquid composition to coagulate to obtain a coagulated composition, c) cutting the coagulated composition, wherein at most 2% w/w whey is released, d) subjecting the coagulated composition from step b) or c) to heating to obtain a core temperature of the coagulated composition of at least 70 degrees C., and e) cooling the heat-treated coagulated composition, wherein the cooking- and/or frying-stable cheese-like product is the coagulated composition obtained under step d) or e).

In step d) of the inventive method, the coagulated composition from step b) or c) is heated to obtain a core temperature of the coagulated composition of at least 70 degrees C. The core temperature of the coagulated composition should be in the range of 70-100 degrees C. Preferably, the core temperature of the coagulated composition is in the range of 70-95 degrees C., in the range of 70-80 degrees C. or in the range of 80-95 degrees C. or in the range of 85-95 degrees C.

The coagulated composition can be heated by use of any kind of heating means, such as by immersing the coagulated composition from step b) or c) into a hot liquid, keeping the coagulated composition in heated surroundings (e.g. a heating chamber), autoclaving the coagulated composition (e.g. under pressure) or heating by microwave irradiation. In a preferred embodiment of the invention, the coagulated composition can be heated by immersing the coagulated composition from step b) or c) into a hot liquid, such as water, milk, brine or whey, until the desired core temperature is reached.

When the coagulated composition is heated, the heating can be carried out in the container, in which the composition was coagulated or be moved to another container suitable for heating the coagulated composition. In one embodiment of the invention, the coagulated composition is heated in the container, vessel, tub, vat, sales package, consumer package, carton in which it coagulated. In another embodiment, the coagulated composition is transferred to another container, vessel, tub, cheese vat, sales package, consumer package or carton for heating. The coagulated composition may cut into smaller pieces and transferred to another container, vessel, tub or cheese vat, and is then packed in a suitable sales package.

In one embodiment of the invention, the liquid composition coagulates in a sales package and is also heated in the sales package so that the coagulum achieves a core temperature of at least 70 degrees C.

In one embodiment of the invention, the invention pertains to a method for preparing a cooking- and/or frying-stable cheese-like product, which method comprises the steps of:

a) providing a liquid composition having a dry matter content in the range of 34-52% w/w, a protein content in the range of 12-30% w/w, a content of micellar casein in the range of 8-25% w/w, a fat content in the range of 5-30% w/w, and wherein the liquid composition has a pH in the range of 4.8-7.0 and a ratio of whey protein to micellar casein of 12:88 to 0:100, b) subjecting the liquid composition to a coagulation step by adding a milk-clotting enzyme, and allowing the liquid composition to coagulate to obtain a coagulated composition, c) cutting the coagulated composition, wherein at most 5% w/w whey is released, d) subjecting the coagulated composition from step b) or c) to heating to obtain a core temperature of the coagulated composition in the range of 70-100 degrees C., such as in the range of 70-95 degrees C., in the range of 80-95 degrees C. or in the range of 85-95 degrees C., and e) cooling the heat-treated coagulated composition, wherein the cooking- and/or frying-stable cheese-like product is the coagulated composition obtained under step d) or e).

In a preferred embodiment of the invention, the invention pertains to a method for preparing a cooking- and/or frying-stable cheese-like product, which method comprises the steps of:

a) providing a liquid composition having a dry matter content in the range of 34-50% w/w, a protein content in the range of 12-25% w/w, a content of micellar casein in the range of 10-25% w/w, a fat content in the range of 5-30% w/w, and wherein the liquid composition has a pH in the range of 4.8-6.5 and a ratio of whey protein to micellar casein of 10:90, b) subjecting the liquid composition to a coagulation step by adding a milk-clotting enzyme, and allowing the liquid composition to coagulate to obtain a coagulated composition, c) cutting the coagulated composition, wherein at most 4% w/w whey is released, d) subjecting the coagulated composition from step b) or c) to heating to obtain a core temperature of the coagulated composition in the range of 70-100 degrees C., such as in the range of 70-95 degrees C., in the range of 80-95 degrees C. or in the range of 85-95 degrees C., and e) cooling the heat-treated coagulated composition, wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:

a) providing a liquid composition having a dry matter content in the range of 40-50% w/w, a protein content in the range of 15-22% w/w, a content of micellar casein in the range of 13-22% w/w, a fat content in the range of 5-30% w/w, and wherein the liquid composition has a pH in the range of 4.8-6.0 and a ratio of whey protein to micellar casein of 8:92 to 0:100, b) subjecting the liquid composition to a coagulation step by adding a milk-clotting enzyme, and allowing the liquid composition to coagulate to obtain a coagulated composition, c) cutting the coagulated composition, wherein at most 3% w/w whey is released, d) subjecting the coagulated composition from step b) or c) to heating to obtain a core temperature of the coagulated composition in the range of 70-100 degrees C., such as in the range of 70-95 degrees C., in the range of 80-95 degrees C. or in the range of 85-95 degrees C., and e) cooling the heat-treated coagulated composition,
wherein the cooking- and/or frying-stable cheese-like product is the coagulated composition obtained under step d) or e).

In a more preferred embodiment of the invention, the invention pertains to a method for preparing a cooking- and/or frying-stable cheese-like product, which method comprises the steps of:
a) providing a liquid composition having a dry matter content in the range of 42-50% w/w, a protein content in the range of 17-20% w/w, a content of micellar casein in the range of 15-20% w/w, a fat content in the range of 5-30% w/w, and wherein the liquid composition has a pH in the range of 4.8-5.7 and a ratio of whey protein to micellar casein of 6:94 to 0:100,
b) subjecting the liquid composition to a coagulation step by adding a milk-clotting enzyme, and allowing the liquid composition to coagulate to obtain a coagulated composition,
c) cutting the coagulated composition, wherein at most 2% w/w whey is released,
d) subjecting the coagulated composition from step b) or c) to heating to obtain a core temperature of the coagulated composition in the range of 70-100 degrees C., such as in the range of 70-95 degrees C., in the range of 80-95 degrees C. or in the range of 85-95 degrees C., and
e) cooling the heat-treated coagulated composition,
wherein the cooking- and/or frying-stable cheese-like product is the coagulated composition obtained under step d) or e).

In step e) of the inventive method, the coagulated composition is cooled so the core temperature of the coagulated composition is below the temperature to which the core of the coagulum was heated under step d). The cooling may be carried out by immersing the coagulated composition in a cold liquid, by use of a cooling tunnel, by use of air cooling or by use of a freezer, e.g. a blast freezer.

In one embodiment of the invention, the coagulated composition is cooled by immersing the coagulated composition into a cold liquid, such as water, milk, brine or whey, until the coagulated composition has the desired temperature. In one embodiment of the invention, the liquid composition coagulates in a sales package, is heated in the sales package so that the coagulum achieves a core temperature of at least 70 degrees C. and is also cooled in the sales package to a temperature in the range of 3-8 degrees C.

In one embodiment, the coagulated composition is cooled to a temperature in the range of 3-20 degrees C. or even colder. Preferably, the coagulated composition is cooled to a temperature in the range of 3-10 degrees C. or in the range of 3-8 degrees C.

The cooking- and/or frying-stable cheese-like product is the coagulated composition obtained under step d) or e). The cooking- and/or frying-stable cheese-like product may be kept at a temperature in the range of 3-10 degrees C. or in the range of 3-8 degrees C.

In one aspect, the invention pertains to a cooking- and/or frying-stable cheese-like product having a dry matter content of at least 34% w/w, a protein content of at least 12% w/w, a content of casein of at least 8% w/w, a pH in the range of 4.8-7.0 and a ratio of whey protein to casein of 12:88 to 0:100.

The dry matter content of the cooking- and/or frying-stable cheese-like product is typically in the range of 34-60% w/w. In some embodiments of the invention, the dry matter content is in the range of 34-52% w/w or 38-50% w/w, such as in the range of 40-50% w/w, preferably in the range of 42-48% w/w. In other embodiments of the invention, the dry matter content is in the range of 34-50% w/w or 34-56% w/w, such as in the range of 34-52% w/w, preferably in the range of 34-40% w/w.

The protein content of the cooking- and/or frying-stable cheese-like product is typically in the range of 12-30% w/w. In one embodiment of the invention, the protein content is in the range of 12-25% w/w, or in the range of 15-22% w/w, preferably in the range of 17-22% w/w.

The amount of casein in the cooking- and/or frying-stable cheese-like product is typically at least 8% w/w. The content of casein may be in the range of 8-30% w/w, such as in the range of 10-30% w/w, or in the range of 13-22% w/w, preferably in the range of 15-20% w/w.

The ratio of whey protein to casein in the cooking- and/or frying-stable cheese-like product is typically in the range of 12:88 to 0:100, such as a ratio of whey protein to casein 11:89 to 0:100, 10:90 to 0:100, 9:91 to 0:100, 8:92 to 0:100, 7:93 to 0:100, 6:94 to 0:100, 5:95 to 0:100, 4:96 to 0:100, 3:97 to 0:100, 2:98 to 0:100, or a ratio of whey protein to casein of 1:99 to 0:100. In one embodiment of the invention, the ratio of whey protein to casein is 12:88 to 0:100, 12:88 to 1:99, 12:88 to 2:98, 12:88 to 3:97, 12:88 to 4:96, or a ratio of whey protein to casein is 12:88 to 5:95.

The amount of fat in the cooking- and/or frying-stable cheese-like product is typically at least 3% w/w, such as at least 5% w/w. The fat content may be in the range of 3-30% w/w or 5-30% w/w, such as in the range of 10-30% w/w, or in the range of 15-25% w/w, preferably in the range of 17-22% w/w. In other embodiments the fat content is in the range of 5-20% w/w, or in the range of 5-15% w/w, preferably in the range of 8-12% w/w.

The amount of salt in the cooking- and/or frying-stable cheese-like product is typically in the range of 1-3.5% w/w, such as in the range of 1-3.0% w/w, or in the range of 1-2.5% w/w, preferably in the range of 1-2.0% w/w.

In one embodiment, the invention pertains to a cooking- and/or frying-stable cheese-like product having a dry matter content in the range of 34-52% w/w, a protein content in the range of 12-25% w/w, a content of casein in the range of 8-25% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 38-50% w/w, a protein content in the range of 12-22% w/w, a content of casein in the range of 10-25% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 40-50% w/w, a protein content in the range of 15-22% w/w, a content of casein in the range of 13-22% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 42-50% w/w, a protein content in the range of 17-20% w/w, a content of casein in the range of 15-20% w/w, a pH in the range of 4.8-7.0 and a ratio of whey protein to casein of 12:88 to 0:100.

In one aspect, the invention pertains to a cooking- and/or frying-stable cheese-like product having a dry matter content of at least 34% w/w, a protein content of at least 12% w/w, a content of casein of at least 8% w/w, a fat content of at least 5% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 34-52% w/w, a protein content in the range of 12-25% w/w, a content of casein in the range of 8-25% w/w, a fat content in the range of 5-30% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 38-50% w/w, a protein content in the range of 12-22% w/w, a content of casein in the range of 10-25% w/w, a fat content in the range of 10-30% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 40-50% w/w, a protein content in the range of 15-22% w/w, a content of casein in the range of 13-22% w/w, a fat content in the range of 15-25% w/w, a pH in the range of 4.8-7.0 and a ratio of whey protein to casein of 12:88 to 0:100.

In one embodiment, the invention pertains to a cooking- and/or frying-stable cheese-like product having a dry matter content in the range of 42-50% w/w, a protein content in the range of 17-20% w/w, a content of casein in the range of 15-20% w/w, a fat content in the range of 17-22% w/w, a pH in the range of 4.8-7.0 and a ratio of whey protein to casein of 12:88 to 0:100.

In one aspect of the invention, the cooking- and/or frying-stable cheese-like product is obtainable by the method of the present invention.

The cooking- and/or frying-stable cheese-like product can be consumed either raw or after being prepared. The cooking- and/or frying-stable cheese-like product can be prepared by boiling, cooking, baking, grilling, frying and/or deep frying. The cooking- and/or frying-stable cheese-like product need not to be portioned in order to be consumed, but it may be convenient to cut the cooking- and/or frying-stable cheese-like product into slices or strips before being consumed.

The cooking- and/or frying-stable cheese-like product may be coated with any suitable coating. In the context of the present invention the term "coated" or "coating" means that the surface of the cooking- and/or frying-stable cheese-like product is covered fully or partly by one or more edible food ingredients, which ingredients are different from the cooking- and/or frying-stable cheese-like product. The coating of the cooking- and/or frying-stable cheese-like product may be performed by immersing, dipping or dredging.

In one embodiment, the cooking- and/or frying-stable cheese-like product is coated with one or more food ingredients, which ingredients are in dry or liquid form or a combination hereof.

In one embodiment of the invention, the cooking- and/or frying-stable cheese-like product is coated with one or more food ingredients, which ingredients is a mixture of at least two ingredients of which one of them is a liquid. In a preferred embodiment of the invention, the cooking- and/or frying-stable cheese-like product is coated with a batter, which batter comprises a liquid food ingredient and a dry food ingredient, e.g. flour. The batter may be seasoned (e.g. with spices, herbs or the like) and may further comprise a leavening agent (e.g. baking soda or baking powder).

The batter can be made from typical batter ingredients like flour, egg, milk, water, baking powder, baking soda, salt, pepper and/or spices, where dry ingredients are mixed with liquid ingredients to form a batter for coating the cooking- and/or frying-stable cheese-like product. The cooking- and/or frying-stable cheese-like product can be coated by the batter by immersing, dipping or dredging. The coated cooking- and/or frying-stable cheese-like product may be prepared by boiling, cooking, baking, grilling, frying and/or deep frying.

In one embodiment, the cooking- and/or frying-stable cheese-like product can be coated with one or more dry food ingredients. The dry ingredients can be selected from the group consisting of flour, breadcrumbs, grains, fruits, seeds, nuts and a combination hereof. The cooking- and/or frying-stable cheese-like product may be immersed, dipped or dredged in the dry ingredient or a mixture of the dry ingredients and thereby forms a coated cooking- and/or frying-stable cheese-like product. The coated cooking- and/or frying-stable cheese-like product may be prepared by boiling, cooking, baking, grilling, frying and/or deep frying.

The cooking- and/or frying-stable cheese-like product can be coated with several different coating, e.g. by applying one coating at a time. In one embodiment the coated cooking- and/or frying-stable cheese-like product is, in a first step, coated with at least one dry ingredient and subsequently coated with at least one other ingredient. In one embodiment, the cooking- and/or frying-stable cheese-like product is coated with a mixture of dry ingredients comprising flour and subsequently dipped in egg or a batter. In one embodiment, the cooking- and/or frying-stable cheese-like product is coated with a mixture of dry ingredients comprising flour, dipped in egg or a batter and further dipped in a second dry ingredient or mixture of ingredients, e.g. breadcrumbs and spices. In one embodiment of the invention, the cooking- and/or frying-stable cheese-like product may be coated with a batter or egg and subsequently coated with one or more dry ingredients. The coated cooking- and/or frying-stable cheese-like product may be prepared by boiling, cooking, baking, grilling, frying and/or deep frying.

In one embodiment of the invention, the cooking- and/or frying-stable cheese-like product is used in a food product. The cooking- and/or frying-stable cheese-like product may be used as an ingredient in a food product such as soups, sauces, stews, omelettes, pies, burgers, sandwiches, paninis, toasts, hot pots, wraps (kebab style), milk tofu style or hot pot cheese, cheese sticks, e.g. deep fried, barbecue sticks.

EXAMPLES

Example 1.1: Determination of Total Protein

The total protein content (true protein) of a sample is determined by:
1) Determining the total nitrogen of the sample following ISO 8968-1/2|IDF 020-1/2- Milk—Determination of nitrogen content—Part 1/2: Determination of nitrogen content using the Kjeldahl method.
2) Determining the non-protein nitrogen of the sample following ISO 8968-4|IDF 020-4-Milk—Determination of nitrogen content—Part 4: Determination of non-protein-nitrogen content.
3) Calculating the total amount protein as $(m_{total\ nitrogen} - m_{non-protein-nitrogen})*6.38$.

Example 1.2: Determination of Ash Content

The ash content of a food product is determined according to NMKL 173:2005 "Ash, gravimetric determination in foods". NMKL is an abbreviation for "Nordisk Metodikkomité for Naeringsmidler".

Example 1.3: Determination of the Dry Matter

The total solids of a solution may be determined according NMKL 110 $2^{nd}$ Edition, 2005 (Total solids (Water)—Gravimetric determination in milk and milk products). NMKL is an abbreviation for "Nordisk Metodikkomité for Naeringsmidler".

Example 1.4: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.5: Determination of the Total Amount of Fat

The amount of fat is determined according to ISO 1211: 2010 (Determination of Fat Content—Röse-Gottlieb Gravimetric Method).

Example 1.6: Determination of the Total Amount of Micellar Casein

The amount of micellar casein can be determined by separation of the casein micelles by ultracentrifugation, preferably by initial equilibration at 30 degrees C. for 1 hour and centrifugation at 100,000 g for 1 hour at the same temperature, and subsequent quantification of the amount separated caseins by HPLC, preferably as outlined in Bobe et al, (Separation and Quantification of Bovine Milk Proteins by Reversed-Phase High-Performance Liquid Chromatography; Bobe et al; J. Agric. Food Chem. 1998, 46, 458-463).

Example 1.7: Determination of pH

All pH values are measured using a pH glass electrode and are normalised to 25 degrees C. The pH glass electrode (having temperature compensation) is rinsed carefully and calibrated before use.

When the sample is in liquid form, pH is measured directly in the liquid solution at 25 degrees C. When the sample is a powder, 10 grams of a powder is dissolved in 90 ml of demineralised water at room temperature while stirring vigorously. The pH of the solution is then measured at 25 degrees C.

Example 1.8: Sensory Evaluation

This sensory evaluation is used as a method to describe and compare a group of formulas. The results are relative. The sensory panel are technical personnel who are trained to evaluate fresh dairy products. The panel is usually 3-5 persons.

There are no reference samples to determine the hardness level between 0 and 10 on the scale, so the evaluation is based on experience, knowing the average grades for the type of product. For example, the sample with the highest relative hardness is not graded 10, but often given a grade according to what is normal for this type of product.

The products were evaluated and ranked by the following characteristics:

| Category | Descriptors |
|---|---|
| Hardness | The hardness of a product can be evaluated before and after frying, cooking or boiling of the product. The higher the hardness, the higher grade on the scale. The scale is available from 0 to 10. The evaluation is made by putting the products next to each other, and then pressing at the centre of the products with a finger, thereby ranking the products and provides them with a hardness score. |
| Texture | The texture of a product is evaluated by putting equal sizes of the product into your mouth, one by one, and taking notes of the following descriptors: chewiness, softness, dryness, brittleness and hardness. |
| Taste | The taste of a product is evaluated by putting equal sizes of the product into your mouth, one by one, and taking notes of the following descriptors: mild, salty, savory, acid/sour, cooked and sweet. |

If more than one sample is evaluated, the samples are compared and ranked according to the parameters evaluated. Samples are allowed to score equally in the evaluation.

Example 2: Preparation of Frying-Stable Cheese-Like Product

The present example prepares frying-stable cheese-like product according to the invention.

The following ingredients were used:

| Ingredient | % w/w |
|---|---|
| Powder mixture comprising a mixture of 70% w/w micellar casein (86.5% w/w protein, and ratio of whey protein:micellar casein is 5:95) and 30% w/w skimmed milk powder (30% protein, ratio whey protein:micellar casein is 20:80) | 23.48 |
| Vegetable fat, palm oil | 19 |
| Water | 51.18 |
| Salt | 1.8 |
| Glucono Delta-Lactone (GDL) | 0.5 |
| Rennet: Chy-max ®, obtained from Christian Hansen | 0.04 |
| Water, for dilution of rennet | 4 |

Water and fat were mixed in a batch cooker (Sharp) under indirect heating to 76 degrees C. The mixture was mixed at 1000 rpm for 10 minutes and the powder mixture was added. The mixture was cooled to 40 degrees C. and salt and GDL was added. Rennet was diluted in 4% w/w of water and added to the mixture. The mixture was filled into moulds and incubated for 40 minutes for the liquid composition to coagulate. The coagulated composition was removed from the moulds and cut into blocks of approximately 10×10×15 cm as shown in FIG. 1. As it can be seen from FIG. 1, no whey is released from the coagulated composition, when the composition was cut into blocks. The blocks were cooked in water at 85 degrees C. for 60 minutes. The coagulated composition was removed from the water and cooled to a temperature of 5 degrees C.

The frying-stable cheese-like product obtained was analyzed according to examples 1.1, 1.3, 1.4 and 1.5. It was found that the nutritive value of the frying-stable cheese-like product is as shown below:

|  | % w/w |
| --- | --- |
| Total dry matter | 43.85 |
| Total protein | 17.49 |
| Total fat | 19.27 |
| Total lactose | 2.85 |
| Calcium | 0.54 |
| Fat in dry matter | 43.94 |

Figure 2:
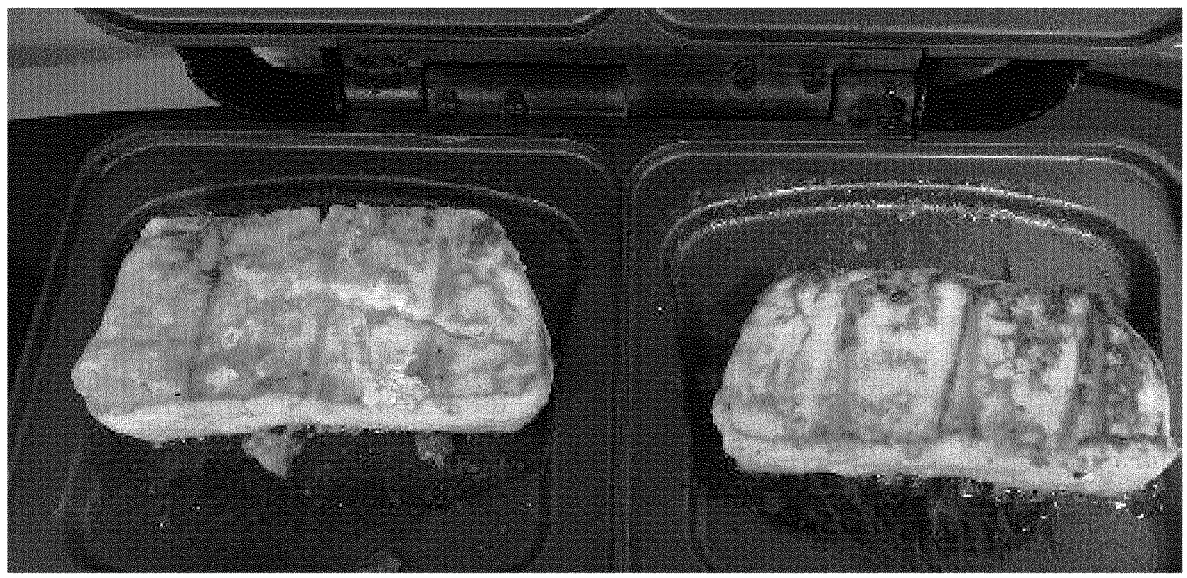
FIG. 2 shows the cooking- and/or frying-stable cheese-like product after frying in the toaster.

The frying-stable cheese-like product was cut into slices and fried in a toaster, which was greased on both frying surfaces. FIG. 2 shows the frying-stable cheese-like product in the toaster. It can be seen from the picture that the fried product maintained the shape of the product before frying.

Figure 3:
FIG. 3 shows a slice of a fried coated frying-stable cheese-like product served as a meat-substitute in a burger.

FIG. 3 shows a slice of a fried coated frying-stable cheese-like product served as a meat-substitute in a burger.

Example 3: Preparation of Frying-Stable Cheese-Like Product in a Sales Package

The present example prepares frying-stable cheese-like product according to the invention.

The example produces frying-stable cheese-like product with a high yield, by use of micellar casein isolate as the perfect choice for optimal and simple production, for emulsifying and to build optimal texture.

The following ingredients were used:

| Ingredient | % w/w |
| --- | --- |
| Micellar casein isolate* | 18.50% |
| Skim milk powder, (35% protein, ratio whey protein:micellar casein is 20:80) | 4.00% |
| Butter, unsalted, 80% fat | 23.00% |
| Water | 54.99% |
| Salt (NaCl) | 1.50% |
| Rennet, Chy-max ® M200, obtained from Christian Hansen | 0.01% |
| Total | 100% |

*Total protein content of 86.5% w/w, and ratio of whey protein:micellar casein 5:95

The frying-stable cheese-like product was produced by heating a mixture of water and butter to a temperature of 95 degrees C. while mixing at 1000 rpm in a batch cooker. Micellar casein isolate and skim milk powder was added and the mixture was mixed for further 10 minutes. The mixture was then cooled to a temperature of 40-45 degrees C. Salt and then rennet was added to the cooled mixture. The liquid mixture was then filled into packing material and sealed. The composition was then incubated at 30-45 degrees C. for about 60 minutes, cooked in water bath at 85 degrees C. until the core temperature reached 75 degrees C. and then finally cooled to a temperature of 5 degrees C. The cheese was cold stored.

The nutritive value of the frying-stable cheese-like product obtained was analyzed according to examples 1.1, 1.3, 1.4 and 1.5 and is shown below.

|  | % w/w |
| --- | --- |
| Protein | 17.56% |
| Fat | 19.22% |
| Lactose | 2.32% |
| Sodium | 0.62% |
| Calcium | 0.54% |
| Fat In Dry Matter | 45.44% |
| Total solids | 42.31% |

The example demonstrates that by use of the inventive method, it is possible to produce a fully frying-stable cheese-like product, which is flexible in sodium content and gains a 100% yields (no wheying off). The method is simple and flexible.

Example 4: Sensory Evaluation of Frying-Stable Cheese

The frying-stable cheese-like product produced by the method according to the present invention was subjected to a sensory evaluation as described in Example 1.8 and below. A prior art Halloumi cheese from Cyprus, which does not contain any micellar casein, was also subjected to the sensory evaluation. Both cheeses were evaluated before and after pan-frying, deep frying and boiling in soup.

Product Preparation:

Fresh—uncooked:

The products which were stored at a temperature between 4 and 7 degrees C. were taken out of the fridge. Within 15 minutes the products were cut into slices of thickness 1.5 cm (±2 mm) and a diameter of 10-15 cm. The product samples were placed horizontally next to each other.

Pan fried/deep fried:

The products which were stored at a temperature between 4 and 7 degrees C. were taken out of the fridge. The products were then cut into slices of thickness 1.5 cm (±2 mm) and a diameter of 10-15 cm. The product samples were then either: 1) pan fried in olive oil for 3-4 minutes on each side; or 2) deep fried in vegetable oil at 170-180 degrees C. for 2-3 minutes. After frying, the product samples were placed on a plate for 5 minutes before evaluation.

Boiled in soup:

The products which were stored at a temperature between 4 and 7 degrees C. were taken out of the fridge. The products were then cut into slices of thickness 7 mm (±2 mm) and a shape of 3.5 cm×2 cm (±2 mm). The product samples were then boiled in a vegetable savory soup at a temperature between 85 and 95 degrees C. for 4-5 minutes. After cooking the product samples were placed on a plate for 1 minute before evaluation.

Results of Sensory Evaluation:

The results of the sensory evaluation are shown in the tables below:

Sensory evaluation results of frying-stable cheese-like product of invention:

|  | Fresh - uncooked | Pan fried/deep fried (1.5 cm thick round pieces) | Boiled in soup (1 × 1 × 1 cm cubes) |
|---|---|---|---|
| Hardness (scale 1-10) | 5 | 6 | 4 |
| Texture | Chewy, with a soft and slightly brittle texture | Chewy with a bite but not hard, like juicy chicken breast | Soft with spongy texture |
| Taste | Mild, milky, fresh and low saltiness | Mild with cooked flavours; fresh cheese taste | Very mild tasting; no absorbed flavour from the soup |

Sensory evaluation results of prior art Halloumi cheese from Cyprus:

|  | Fresh - uncooked | Pan fried/deep fried (1.5 cm thick round pieces) | Boiled in soup (1 × 1 × 1 cm cubes) |
|---|---|---|---|
| Hardness (scale 1-10) | 8 | 8 | 7 |
| Texture | Hard, with a dry and rubbery texture | Hard with a heavy bite, like a dry "overcooked" chicken breast | Hard, with heavy and non-spongy texture |
| Taste | Salty and slightly sour and bitter notes | Salty with heavy savory notes | Salty with heavy savory notes, no absorption from soup |

The sensory results showed that the frying-stable cheese according to the invention scored lower levels on the hardness scale than the prior art cheese.

The fresh—uncooked, frying-stable cheese according to the invention has a chewy texture with a slightly brittle texture, whereas the texture of the prior art, fresh—uncooked cheese showed to be hard with a dry and rubbery texture. The taste of the fresh—uncooked, frying-stable cheese according to the invention is mild, milky, fresh with low saltiness, whereas the taste of the prior art, fresh—uncooked cheese is salty and slightly sour and bitter notes.

The pan fried/deep fried, frying-stable cheese according to the invention has a chewy texture with a bite but not hard; such like juicy chicken breast. The taste is mild with cooked flavours and fresh cheese taste. The prior art, pan fried/deep fried cheese has a hard texture with a heavy bite, such like a dry "overcooked" chicken breast. The taste is salty with heavy savory notes.

The boiled in soup, frying-stable cheese according to the invention has a soft with spongy texture and the taste is very mild with no absorbed flavor from the soup. The prior art, boiled in soup cheese has a hard texture with a heavy and non-spongy texture. The taste is salty with heavy savory notes and no absorption of flavours from the soup.

From the above results of the sensory evaluation it is seen that the frying-stable, cheese-like product according to the invention is less hard than the prior art cheese and possesses improved properties with regard to texture and taste as compared to the prior art cheese.

Example 5: Preparation and Evaluation of Cooking-Stable Cheese Recombined

The present example produces cooking-stable cheese-like product according to the invention, which is suitable for use as plain cooking-stable cheese used for burgers, salads and sandwiches, hot pot cheese, milk tofu style, marinated cheese, nuggets, fries and the like.

The following ingredients were used:

| Ingredient | % w/w |
|---|---|
| Protein mixture comprising 85% w/w MCI and 15% w/w skimmed milk powder* | 25.90 |
| Butter, unsalted | 12.00 |
| Water, tap | 56.20 |
| Salt | 1.40 |
| Glucono Delta-Lactone (GDL) | 0.50 |
| Rennet, diluted, 1% solution | 4.00 |

*The MCI has a total protein content of 86.5% w/w and the ratio of whey protein:micellar casein is 5:95; the skimmed milk powder has a total protein content of 36% w/w the ratio of whey protein:micellar casein is 20:80

Water and butter were mixed at mixing speed of approx. 1000 r.p.m. in a batch cooker (e.g. Stephan Cooker UM/SK) at 85 degrees C. MCI powder and skimmed milk powder were added to the mixture and the mixture was mixed for 10 minutes. The mixture was then cooled to 38-40 degrees C. The pH of the cooled mixture was about 6.6. Salt and acidifier (GDL) were added during mixing and thereafter diluted rennet was added and the mixture was mixed for 10 seconds. The cheese mass was then filled into packaging materials having the size of approx. 10×10×15 cm and incubated at 25-40 degrees C. for approx. 60 minutes. The pH after incubation was about 6.0. Then the incubated mixture was cooked in water bath at 85 degrees C. until a core temperature of minimum 75 degrees C. was reached. The cooked cheese was then removed from the water bath and cooled to 5 degrees C. and stored cold.

The nutritive value of the cooking-stable cheese-like product obtained was analyzed according to examples 1.1, 1.3, 1.4 and 1.5 and is shown below.

|  | % w/w |
|---|---|
| Protein | 20.5% |
| Fat | 10% |
| Lactose | 2.22% |
| Sodium | 0.58% |
| Fat In Dry Matter | 27.89% |
| Total solids | 36.77% |

Cooking Behaviour:

The cooking-stable cheese-like product was sliced in 1 cm high patties with a diameter at 8 cm. Alternatively, the cooking-stable cheese could be cut in squares of 1×5×8 cm. A frying pan was pre-heated at medium heat (6 out of 9 power) with a table spoon of rapeseed oil. The cooking-stable cheese was then fried at both sides for approx. 4 minutes until roast crust appeared. During frying the pan was shaken laterally, which allows the cheese to slip the pan. The cooking-stable cheese kept its shape during frying and it easily slipped the pan. During frying the surface got a meat-like roast crust. The fried cooking-stable cheese was placed on a plate with kitchen paper for 2-3 minutes to rest before the sensory evaluation.

Product Characteristics and Sensory Evaluation

The final product is characterised as stable during frying and as having non-sticking characteristics, i.e. the fried product easily slips the pan. The Juiciness is preserved in the final product, it has a good crust, a clean milky taste and good chewiness with a little squeaking sound.

Applications

The prepared cheese-like product is particular suitable for use as plain cooking-stable cheese used for burgers, salads and sandwiches, hot pot cheese, milk tofu style, marinated cheese, nuggets, fries and the like. The cheese-like product may be breaded, marinated, fortified or just plain. The cheese-like product is pan fry- and grill-stable and the breaded variants can also be deep fried. The cooking-stable cheese can also be added in small cubes into soups or likewise few minutes before serving.

Figure 4:
FIG. 4 shows the cooking-stable cheese-like product as a plain cheese which has been pan fried in rapeseed oil.

FIG. 4 shows the cheese-like product as a plain cheese which has been pan fried in rapeseed oil. The cheese is stable during cooking, it easily slips off the pan, i.e. non-stick characteristics, and it got a good roast crust.

Figure 5:
FIG. 5 shows a plain cooking-stable cheese-like product, which has been, grill-pan-fried in rapeseed oil and served in a meatless burger.

In FIG. 5, a plain cheese-like product is shown, which has been, grill-pan-fried in rapeseed oil. The cheese-like product is stable during cooking, it easily slips off the pan, i.e. non-stick characteristics, and it got a good roast crust from the grill pan. In FIG. 5, the cheese-like product is used in meatless burgers.

Figure 6:
FIG. 6 shows a plain cooking-stable cheese-like product with barbeque marinade and pan fried in rapeseed oil.

FIG. 6 shows a plain cheese-like product with barbeque marinade and pan fried in rapeseed oil. The cheese-like product is stable during cooking it easily slips off the pan, i.e. non-stick characteristics, and it got a good roast crust from the grill pan. The marinade can be added in the single packaging or just before frying.

Example 6: Preparation and Evaluation of a Cheese-Like Product in the Form of a Minced Meat Alternative Used for Minced Meat Dishes The present example produces cooking-stable cheese-like product according to the invention mixed with yeast extract and brown colour, which makes it suitable for use in meatless cooking in dishes such as lasagne, bolognaise, taco, wraps and the like.

The following ingredients were used:

| Ingredient | % w/w |
| --- | --- |
| Protein mixture comprising 85% w/w MCI and 15% w/w skimmed milk powder* | 25.90 |
| Yeast extract | 0.35 |
| Butter, unsalted | 12.00 |
| Water, tap | 55.75 |
| Brown colour, liquid form | 0.10 |
| Salt | 1.40 |
| Glucono Delta-Lactone (GDL) | 0.50 |
| Rennet, diluted, 1% solution | 4.00 |

*The MCI has a total protein content of 86.5% w/w and the ratio of whey protein:micellar casein is 5:95; the skimmed milk powder has a total protein content of 36% w/w the ratio of whey protein:micellar casein is 20:80

Water and butter were mixed at mixing speed of approx. 1000 r.p.m. in a batch cooker (e.g. Stephan Cooker UM/SK) at 85 degrees C. MCI powder, skimmed milk powder and yeast extract were added to the mixture and the mixture was mixed for 10 minutes. The mixture was then cooled to 38-40 degrees C. The pH of the cooled mixture was about 6.6. Brown colour in liquid form was added during mixing, then salt and acidifier (GDL) were added during mixing and thereafter diluted rennet was added and the mixture was mixed for 10 seconds. The cheese mass was then filled into packaging materials having the size of approx. 10×10×15 cm and incubated at 25-40 degrees C. for approx. 60 minutes. The pH after incubation was about 6.0. Then the incubated mixture was cooked in water bath at 85 degrees C. until a core temperature of minimum 75 degrees C. was reached. The cooked cheese was then removed from the water bath and cooled to 5 degrees C. The cooled product was then grated, repacked and store chilled at 5 degrees C. or freezed and stored at −18 degrees C.

In alternative embodiments the step of cooking in water bath of 85 degrees C. can be left out. This results in shorter storage time at 5 degrees C. and storage at refrigerated temperatures is therefore recommended.

The nutritive value of the cooking-stable cheese-like product obtained was analyzed according to examples 1.1, 1.3, 1.4 and 1.5 and is shown below.

|  | % w/w |
| --- | --- |
| Protein | 20.5% |
| Fat | 10% |
| Lactose | 1.91% |
| Sodium | 0.58% |
| Fat In Dry Matter | 28.13% |
| Total solids | 36.83% |

Cooking Behaviour of Mexican Taco Style:

If the grated meat alternative was stored at −18 degrees then it was slowly defrozen at the kitchen table or in the refrigerator overnight before cooking. If the grated meat alternative was stored at 5 degrees C. then the product was taken out of the refrigerator just before use. A frying pan was preheated at medium heat (6 out of 9 power). The grated meat alternative was then added to the pan together with spices (premix Taco spices from Santa Maria) and the mixture was stirred gently in order to mix cheese-like product and spices. The mixture was fried for approx. 12-15 minutes, but without stirring all the time. Roast crust will appear when stirring only every second minute. Then the heat was turned off and the minced meat alternative taco mix was allowed to rest for 2-3 minutes before the sensory evaluation. It was served with heated tortillas pancakes, salad, cubed avocadoes, cream fraiche and fresh cilantro.

Product Characteristics and Sensory Evaluation of Mexican Taco Styles

The final product is characterised as stable during defrosting with no syneresis or water loss. The final product is also stable during frying and it has non-sticking characteristics, i.e. the fried product easily slips the pan. The fried product keeps its juiciness and has a good crust. It looks like chicken meat, has umami taste and good chewiness with a little squeaking sound. The incorporation of spices is done effectively.

Evaluation of tacos: Scale 1-5:

| Description | Cooking behaviour | Taste | Bite and mouthfeel | Visual appearance |
| --- | --- | --- | --- | --- |
| Minced meat alternative | 4 | 5 | 4 | 5 |
| Minced pork | 5 | 5 | 5 | 5 |

Description of score system:

Cooking behaviour: 1=total unable to fry; 2=difficult to fry, leaks a lot of water; 3=able to fry, but is still unsuitable; 4=able to fry, stable during frying, making roast crust; 5=excellent to fry, leaks no water, make roast crust.

Taste: 1=bad taste/off taste; 2=unpleasant taste; 3=acceptable, little off taste; 4=acceptable, no off taste; 5=excellent taste Bit and mouthfeel: 1=no meat texture at all; 2=only little meat texture; 3=acceptable, but still different from meat; 4=acceptable, very close to meat texture; 5=typical meat structure Visual appearance: 1=no meat appearance at all, 2=very little meat appearance; 3=some meat appearance; 4=very close to meat appearance; 5=typical meat appearance Applications of Mexican Taco Styles:

The grated cooking-stable cheese-like product with added yeast and brown color is particular suitable for use in meatless dishes such as lasagne, bolognaise, taco, wraps and the like.

Figure 7:
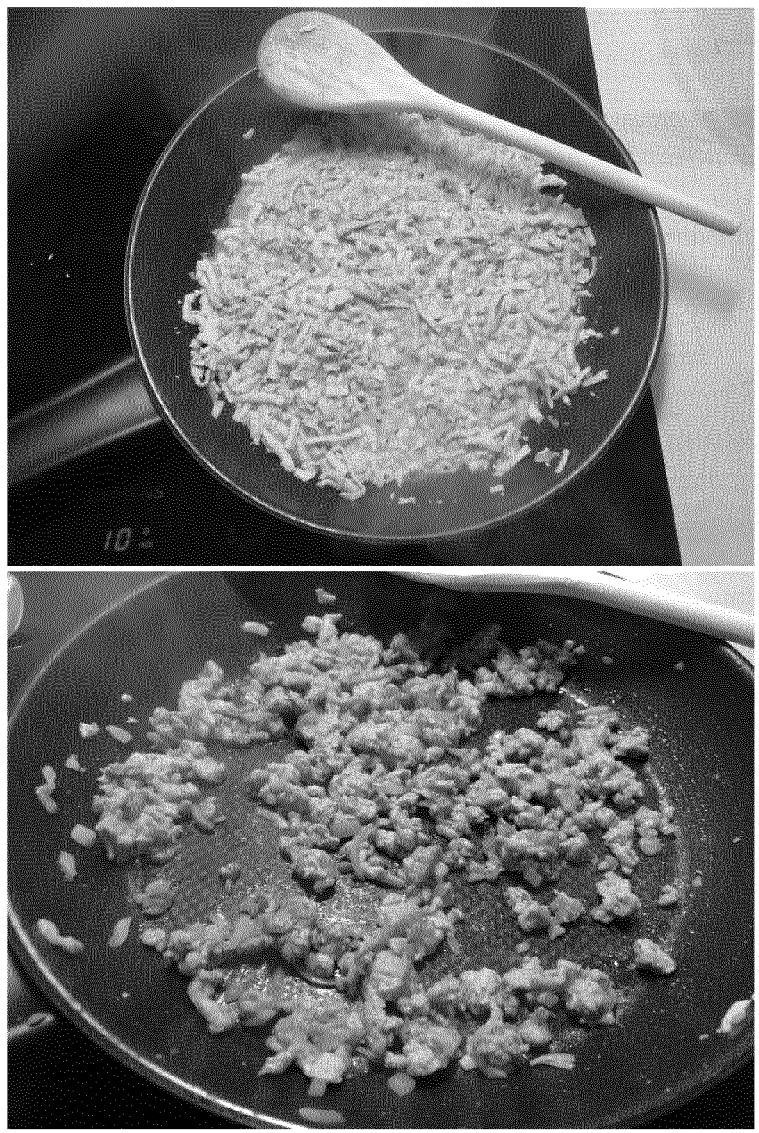
FIG. 7 shows a grated meatless product, which has been pan fried with taco spices mix from Santa Maria and small pieces of chopped onions.

FIG. 7 shows the grated meatless product, which has been pan fried with taco spices mix from Santa Maria and small pieces of chopped onions. The cheese is stable during frying, it easily slips off the pan, it got a good roast crust and incorporates the spices effectively. It has been stored at −18 degrees C. and defrosted at room temperature before use.

Figure 8:
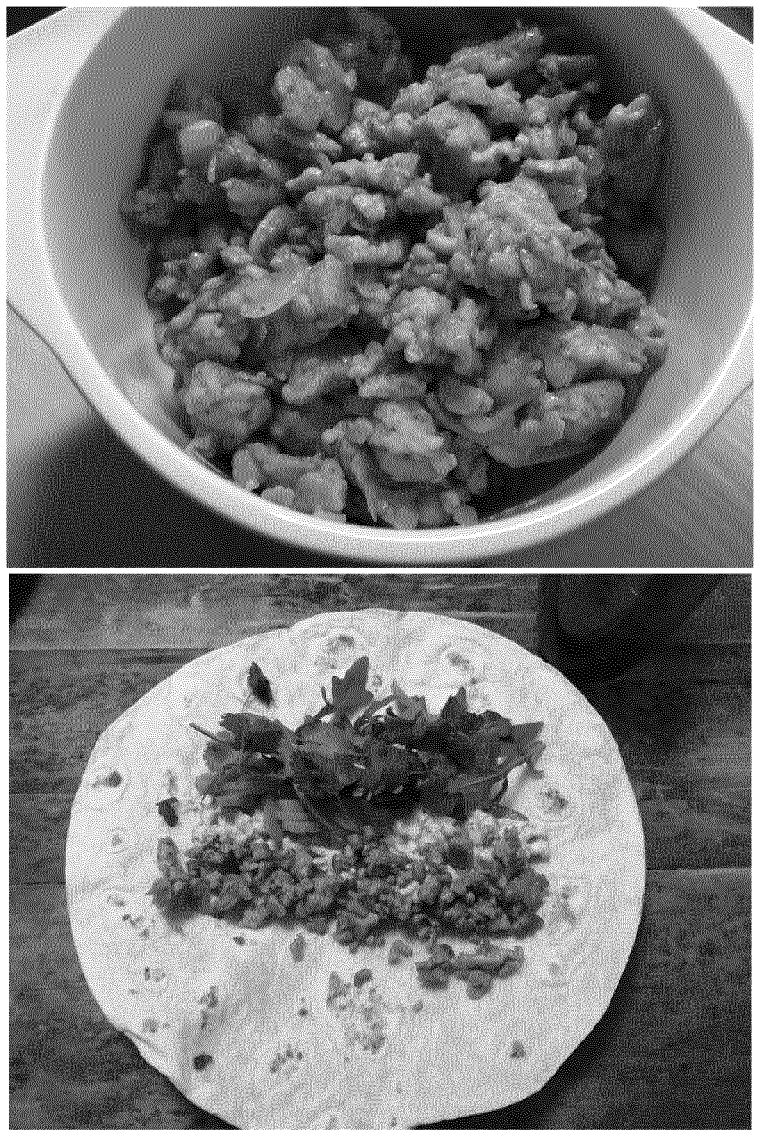
FIG. 8 shows a grated meatless product used for taco. The meatless product is pan fried with onions and taco spices mix and served on tortilla with vegetables and fresh cilantro.

In FIG. 8 the final result of grated meatless product used for taco is shown. The meatless product is pan fried with onions and taco spices mix. It is served on tortilla with vegetables and fresh cilantro. The visual appearance is much like fried minced chicken meat.

Cooking Behaviour of the Meatless Meatballs:

The cooking-stable cheese-like product as defined in this example is also useful as half fabricate used for meatballs, sausages etc. The half fabricate is mixed with e.g. onion powder, spices, water binding agents and fibers.

If the grated meat alternative was stored at −18 degrees then it was slowly defrozen at the kitchen table or in the refrigerator overnight before cooking. If the grated meat alternative was stored at 5 degrees C. then the product was taken out of the refrigerator just before use. The following ingredients were then mixed by handcraft (use gloves):

7.2% cheese binder mix (developed by Solina, Denmark)
60.7% minced meat alternative (the half fabricate from Arla Ingredients)
27.7% water
4.4% rapeseed oil The meatless meatball mass rested for 20 minutes and then meatballs were shaped with diameter at 3 cm. A frying pan was preheated at medium heat (6 out of 9 power) with 2 table spoons of rapeseed oil. The meatballs were added to the heated pan and the pan were gently stirred laterally by handcraft. The meatballs were fried for approx. 10 minutes. A roast crust appeared when the pan was only stirred every second minute. The heat was then turned off and the meatless meatballs rested for 2-3 minutes before the sensory evaluation. The meatballs were served with tomato sauce.

Product Characteristics and Sensory Evaluation of the Meatless Meatballs:

The final product is characterised as stable during defrosting with no syneresis or water loss. The product is easy to shape with the cheese binder mixture. The final product is also stable during frying and it has non-sticking characteristics, i.e. the fried product easily slips the pan. The fried product keeps its juiciness and has a good crust. It looks like chicken meat, has umami taste and good chewiness with a little squeaking sound. The incorporation of spices is done effectively.

Evaluation of meatless meatballs: Scale 1-5:

| Description | Cooking behaviour | Taste | Bite and mouthfeel | Visual appearance |
|---|---|---|---|---|
| Minced meat alternative | 5 | 4 | 4 | 5 |
| Minced pork | 5 | 5 | 5 | 5 |

The score system is the same as the one for evaluation of tacos mentioned above.

Applications of the Meatless Meatballs

The cooking-stable cheese-like product as defined in this example is also useful as half fabricate used for meatballs, sausages etc. The half fabricate is mixed with e.g. onion powder, spices, water binding agents and fibers.

Figure 9:
FIG. 9 shows a meatless product used as half fabricate.
Figure 9:

In FIG. 9 the meatless product used as half fabricate is shown. The meatless product is mixed with cheese binder mix from Solina Denmark, water and oil (sun flower or rapeseed). The mass has to rest for 20 minutes.

Figure 10:
FIG. 10 shows a meatless product formed like a Danish "karbonade".
Figure 10:
Figure 10:

FIG. 10 shows the meatless product shown in FIG. 9 which after 20 minutes of rest is easy to form. In FIG. 10, the meatless product is formed like a Danish "karbonade". The behaviour is much like minced meat used for meatballs. The meatless meatball is pan fried in rapeseed oil. The roast crust is crusty and look just like had it been real meat. The meatless meatball is stable during frying and easily slips of the pan. The structure inside the meatless meatball is minced meat like.

Figure 11:
FIG. 11 shows a meatless product formed to small meatballs with diameter of 2-3 cm.
Figure 11:

FIG. 11 shows the meatless product shown in FIG. 9 which after 20 minutes of rest is easy to form. In FIG. 11, the meatless product is formed to small meatballs with diameter of 2-3 cm. The behaviour is much like minced meat used for meatballs. The meatless meatball is pan fried in rapeseed oil. The roast crust is crusty and look just like had it been a real meatball. The meatless meatball is stable during frying and easily slips of the pan. The structure inside the meatless meatball is minced meat like. In FIG. 11 the meatballs are served with pasta and tomato sauce.

Example 7: Preparation and Evaluation of Cooking Stable Cheese Based on Milk and Cream The present example produces cooking-stable cheese-like product according to the invention which is particular suitable for use as plain cooking-stable cheese used for burgers, salads and sandwiches, hot pot cheese, milk tofu style, marinated cheese, nuggets, fries and the like.

The following ingredients were used:

| Ingredient | % w/w |
|---|---|
| Protein mixture comprising 70% w/w MCI and 30% w/w skimmed milk powder* | 21.50 |
| Cream, 38% fat | 50.00 |
| Skimmed milk | 22.10 |
| Salt | 1.40 |
| Glucono Delta-Lactone (GDL) | 1.00 |
| Rennet, diluted, 1% solution | 4.00 |

*The MCI has a total protein content of 86.5% w/w and the ratio of whey protein:micellar casein is 5:95; the skimmed milk powder has a total protein content of 36% w/w the ratio of whey protein:micellar casein is 20:80

Skimmed milk and cream were mixed at mixing speed of approx. 1000 r.p.m. in a batch cooker (e.g. Stephan Cooker UM/SK) at 76 degrees C. Protein solution was added to the mixture and the mixture was mixed for 10 minutes. The mixture was then cooled to 38-40 degrees C. The pH of the cooled mixture was about 6.6. Salt and acidifier (GDL) were added during mixing and thereafter diluted rennet was added and the mixture was mixed for 10 seconds. The cheese mass was then filled into packaging materials having the size of approx. 10×10×15 cm and incubated at 25-40 degrees C. for approx. 60 minutes. The pH after incubation was about 6.0. Then the incubated mixture was cooked in water bath at 85 degrees C. until a core temperature of minimum 75 degrees C. was reached. The cooked cheese was then removed from the water bath and cooled to 5 degrees C. and stored cold.

In alternative embodiments the step of cooking in water bath of 85 degrees C. can be left out. This results in shorter storage time at 5 degrees C. and storage at refrigerated temperatures is therefore recommended.

The nutritive value of the cooking-stable cheese-like product obtained was analysed according to examples 1.1, 1.3, 1.4 and 1.5 and is shown below.

|  | % w/w |
| --- | --- |
| Protein | 17.16% |
| Fat | 19.30% |
| Lactose | 6.08% |
| Sodium | 0.52% |
| Fat In Dry Matter | 41.02% |
| Total solids | 47.05% |

Cooking Behaviour:

The cooking-stable cheese-like product was sliced in 1 cm high patties with a diameter at 8 cm. Alternatively, the cooking-stable cheese could be cut in squares of 1×5×8 cm. A frying pan was pre-heated at medium heat (6 out of 9 power) with a table spoon of rapeseed oil. The cooking-stable cheese was then fried at both sides for approx. 4 minutes until roast crust appeared. The cooking-stable cheese kept its shape during frying and easily slipped the pan. During frying the surface got a meat-like roast crust. The fried cooking-stable cheese was placed on a plate with kitchen paper for 2-3 minutes to rest before the sensory evaluation.

Product Characteristics and Sensory Evaluation of the Cooking-Stable Cheese Based on Milk and Cream The final product is characterised as stable during frying and as having non-sticking characteristics, i.e. the fried product easily slips the pan. The juiciness is preserved in the final product, it has a good crust, a clean milky taste and good chewiness with a little squeaking sound. The product has a more soft texture as compared to recombined cooking-stable cheese. This improved texture is believed to be due to the higher fat content, and not due to the process.

Applications of the Cooking-Stable Cheese Based on Milk and Cream

The prepared cheese-like product is particular suitable for use as plain cooking-stable cheese used for burgers, salads and sandwiches, hot pot cheese, milk tofu style, marinated cheese, nuggets, fries and the like. The cheese-like product may be breaded, marinated, fortified or just plain. The cheese-like product is pan fry- and grill-stable and the breaded variants can also be deep fried. The cooking-stable cheese can also be added in small cubes into soups or likewise few minutes before serving. The product has a high fat content and soft texture.

The invention claimed is:

1. A method for preparing a cooking- and/or frying-stable cheese-like product, which method comprises the steps of:
   a) providing a liquid composition having a dry matter content of at least 34% w/w, a protein content of at least 12% w/w, a content of micellar casein of at least 8% w/w, and wherein the liquid composition has a pH in the range of 4.8-7.0 and a ratio of whey protein to micellar casein of 12:88 to 0:100 w/w,
   b) subjecting the liquid composition to a coagulation step by adding a milk-clotting enzyme, and allowing the liquid composition to coagulate to obtain a coagulated composition,
   c) optionally, cutting the coagulated composition,
   d) subjecting the coagulated composition from step b) or the step c) to heating to obtain a core temperature of the coagulated composition of at least 70 degrees C. to obtain a heat-treated coagulated composition, and
   e) cooling the heat-treated coagulated composition,
   wherein the cooking- and/or frying-stable cheese-like product is the coagulated composition obtained under the step d) or the step e).

2. The method according to claim 1, wherein the liquid composition of the step a) has a dry matter content in the range of 34-52% w/w.

3. The method according to claim 1, wherein the liquid composition of the step a) has a protein content in the range of 12-30% w/w.

4. The method according to claim 1, wherein the liquid composition of the a) has content of micellar casein in the range of 8-25% w/w.

5. The method according to claim 1, wherein the liquid composition of the step a) comprises one or more of
   i) whey powder, whey protein concentrate (WPC), whey protein isolate (WPI), serum protein concentrate (SPC), milk powder, milk protein isolate (MPI), milk protein concentrate (MPC) or a combination thereof,
   ii) micellar casein isolate and skimmed milk powder,
   iii) vegetable fat and/or animal fat, wherein the vegetable fat and/or animal fat has a fat content of 5-30% w/w.

6. The method according to claim 1, wherein the liquid composition of the step a) has a ratio of whey protein to the micellar casein of 8:92 to 0:100 w/w.

7. The method according to claim 1, wherein the liquid composition of the step b) has a temperature in the range of 20-50 degrees C.

8. The method according to claim 1, wherein the coagulation in the step b) is carried out in a container, vessel, tub, cheese vat, in a sales package, consumer package or a carton.

9. The method according to claim 1, wherein the coagulated composition of the step c) is cut into blocks, grains, cubes or slices.

10. The method according to claim 1, wherein the coagulated composition of the step b) or the step c) is subjected to heating in the step d) to obtain a core temperature of the coagulated composition in the range of 70-95 degrees C.

11. The method according to claim 1, wherein the heating in the step d) and the cooling in the step e) are carried out in a sales package.

12. The method according to claim 1, wherein the coagulated composition obtained in the step d) is cooled in the step e) to a temperature in the range of 3-20 degrees C.

* * * * *